J. GEISS.
BRAKE BAND CLIP.
APPLICATION FILED AUG. 20, 1913. RENEWED NOV. 28, 1914.
1,145,302.
Patented July 6, 1915.
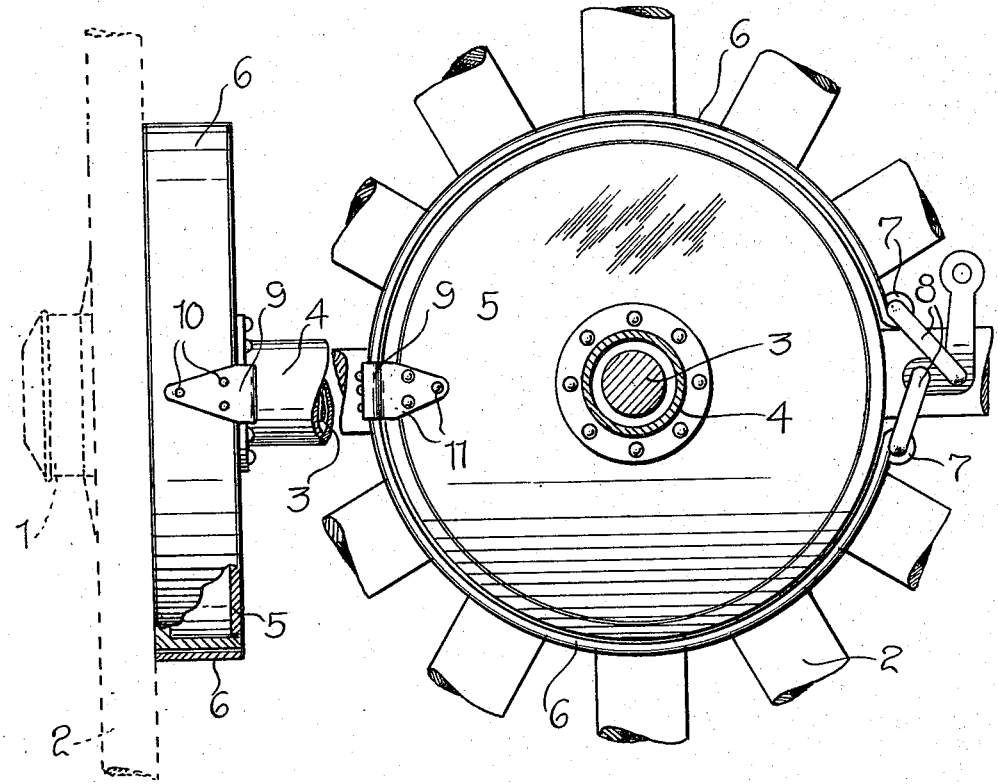
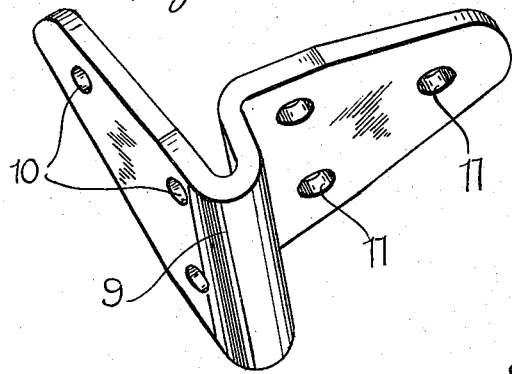
Inventor
J. GEISS
Witnesses
Robert M. Sutphen
A. S. Hurd
By Watson E. Coleman
Attorney

UNITED STATES PATENT OFFICE.

JOHN GEISS, OF CLEVELAND, OHIO.

BRAKE-BAND CLIP.

1,145,302. Specification of Letters Patent. Patented July 6, 1915.

Application filed August 20, 1913, Serial No. 785,806. Renewed November 28, 1914. Serial No. 874,560.

*To all whom it may concern:*

Be it known that I, JOHN GEISS, a citizen of the United States, residing at Cleveland, in the county of Cuyahoga and State of Ohio, have invented certain new and useful Improvements in Brake-Band Clips, of which the following is a specification, reference being had to the accompanying drawings.

This invention comprehends certain new and useful improvements in brake mechanism and relates more specifically to improved and novel means for detachably securing a brake band in position around the hub of a wheel.

An object of the invention is to provide a brake band clip which may be readily secured to a brake band and to a dust plate or the like at the end of a hub, whereby said brake band will be properly held in position around the hub to be clamped upon the same to serve as a brake and stop rotation of the wheel.

A further object is to provide a device of this character which may be employed for securing the brake band in position around the hubs of various forms of wheels and which will be highly efficient and effective as well as extremely simple and cheap to manufacture.

With the above and other objects in view, my invention consists in certain novel constructions, combinations, and arrangements of parts to be hereinafter more fully described, claimed, and illustrated in the accompanying drawings, in which, Figure 1 is an elevational view of my device in use, showing the axle and axle casing in section; Fig. 2 is an elevational view at right angles to Fig. 1 with parts broken away and shown in section; and Fig. 3 is an enlarged detail perspective view of the brake band clip removed.

Referring more specifically to the drawings in which similar reference characters designate corresponding parts throughout the several views, 1 designates the hub of a wheel 2 mounted upon an end of the axle 3 within the axle casing 4, an ordinary dust plate 5 being carried upon the end of the axle 4 and at the end of the hub 1 to prevent dust from entering said hub and a transversely split brake band 6 being positioned around the end of the hub.

The transversely split brake band 6, which is formed of resilient metal or other suitable material and has its end bent back to form loops 7 within which links 8 of an ordinary brake band operating mechanism are engaged, as clearly shown in Fig. 1, is secured in position around the inner end of the hub 1 by my improved brake band clip 9 which is of substantially L-shaped form and has its central portion curved to avoid one edge of the brake band, one arm of the brake band clip being provided with suitable rivet openings 10 through which rivets or other suitable means may be engaged for securing said arm to the outer face of the brake band and preferably intermediate the ends of said band. The other arm of the brake band clip is also provided with suitable openings 11 through which rivets or other securing members may be engaged for securing said arm to one face of the dust plate 5.

It will be seen that my brake band clip is of extremely simple construction and may be formed of strap iron or other suitable material and will be extremely cheap to manufacture. It will also be evident that when the brake band 6 is secured in position by my improved brake band clip, the hub 1 may be readily rotated within the brake band 6 until the brake band mechanism is thrown into operation to draw the ends of the brake band toward one another and cause said brake band 6 to bind around the end of the hub, thereby preventing further rotation of said hub 1.

From the foregoing it will be apparent that I have provided a brake band clip which may be readily employed for securing various forms of brake bands in position around hubs of various forms of wheels and while I have shown the preferred embodiment of my device, it will be understood that minor changes in the details of construction and arrangement of parts may be made within the scope of the appended claims without departing from the spirit of my invention or sacrificing any of the advantages of the same.

What I claim is:—

1. A device of the class described comprising the combination with a dust plate and brake band, of a brake band clip having a resilient central looped portion with arms projecting therefrom at substantially right angles to one another, one of said arms being offset from the inner end of the other arm and adapted to be secured to the dust plate, while the said other arm is adapted to be secured to the brake band, and normally retain the latter in spaced relation with the hub around which it is engaged.

2. As an article of manufacture, a brake band clip formed in one piece and having a curved central spring portion and outwardly directed arms extended at substantially right angles to one another, one of said arms being offset from the curved central spring portion, each of said arms being provided with a plurality of spaced openings to receive securing means to secure the opposite arms to a brake band and a dust plate.

In testimony whereof I hereunto affix my signature in the presence of two witnesses.

JOHN GEISS.

Witnesses:
 HENRY J. STOBBE,
 GEORGE H. BUBEL.

Copies of this patent may be obtained for five cents each, by addressing the "Commissioner of Patents, Washington, D. C."